United States Patent [19]
Leming et al.

[11] 3,785,316
[45] Jan. 15, 1974

[54] HEAVY DUTY SWIVEL PLATFORM CONVEYOR

[76] Inventors: John C. Leming, 25180 Stratford Rd., Glen Ellyn, Ill. 60137; Donelson C. Glassie, 3810 Bradley Ln., Chevy Chase, Md. 20015; Roy M. Jahnel, 2016 Jameson St., Washington, D.C. 20031

[22] Filed: Apr. 21, 1972

[21] Appl. No.: 246,460

[52] U.S. Cl.............. 114/43.5, 74/58, 74/89.15, 74/479, 244/116
[51] Int. Cl............................................ B63b 35/50
[58] Field of Search............... 114/43.5; 244/114, 244/115, 116; 214/83.24; 74/89.15, 58, 479; 115/1 R; 105/367, 368 R, 455

[56] References Cited
UNITED STATES PATENTS

| | | | |
|---|---|---|---|
| 1,812,237 | 6/1931 | Garcia | 244/116 |
| 2,573,496 | 10/1951 | Runkle | 214/83.24 |
| 2,483,121 | 9/1949 | Bourassa | 74/58 |
| 3,382,836 | 5/1968 | Hume | 115/1 |
| 3,303,807 | 2/1967 | Stewart et al. | 114/43.5 |
| 3,616,704 | 11/1971 | Martin | 74/89.15 |
| 2,229,483 | 1/1941 | Toulmin | 214/83.24 |
| 3,568,957 | 3/1971 | Wood | 74/89.15 |

FOREIGN PATENTS OR APPLICATIONS

| | | | |
|---|---|---|---|
| 928,409 | 6/1963 | England | 244/114 |

Primary Examiner—Duane A. Reger
Assistant Examiner—Galen L. Barefoot
Attorney—Benjamin H. Sherman et al.

[57] ABSTRACT

A heavy-duty swivel platform conveyor such as may serve as a helicopter landing pad on a ship deck includes a platform structure, transporting longspan screw device under the platform fixed to the deck or other base and with driving couplings with the platform enabling swiveling of the platform relative to the path along which the platform is adapted to be transported by operation of the longspan screw.

18 Claims, 7 Drawing Figures

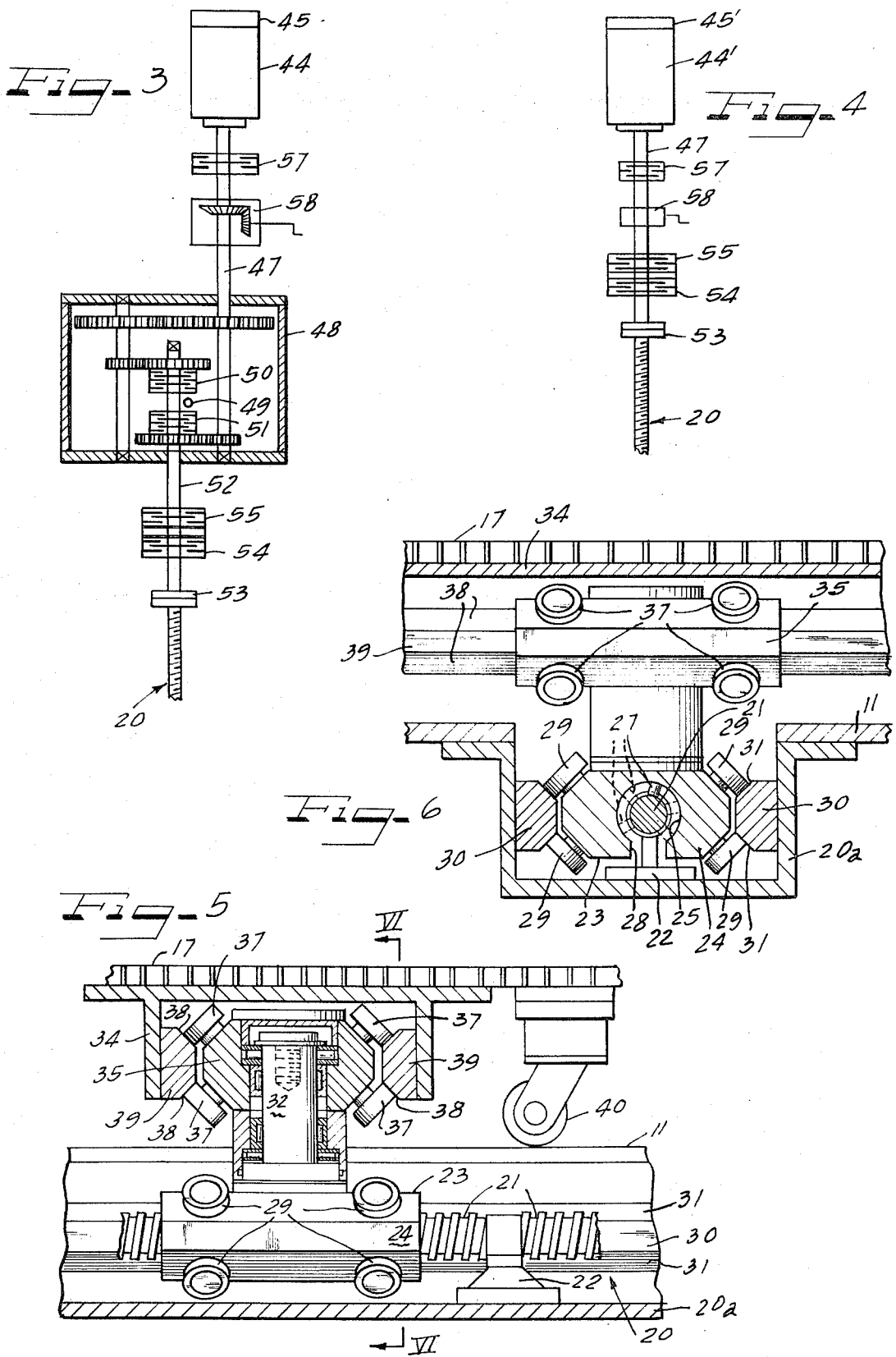

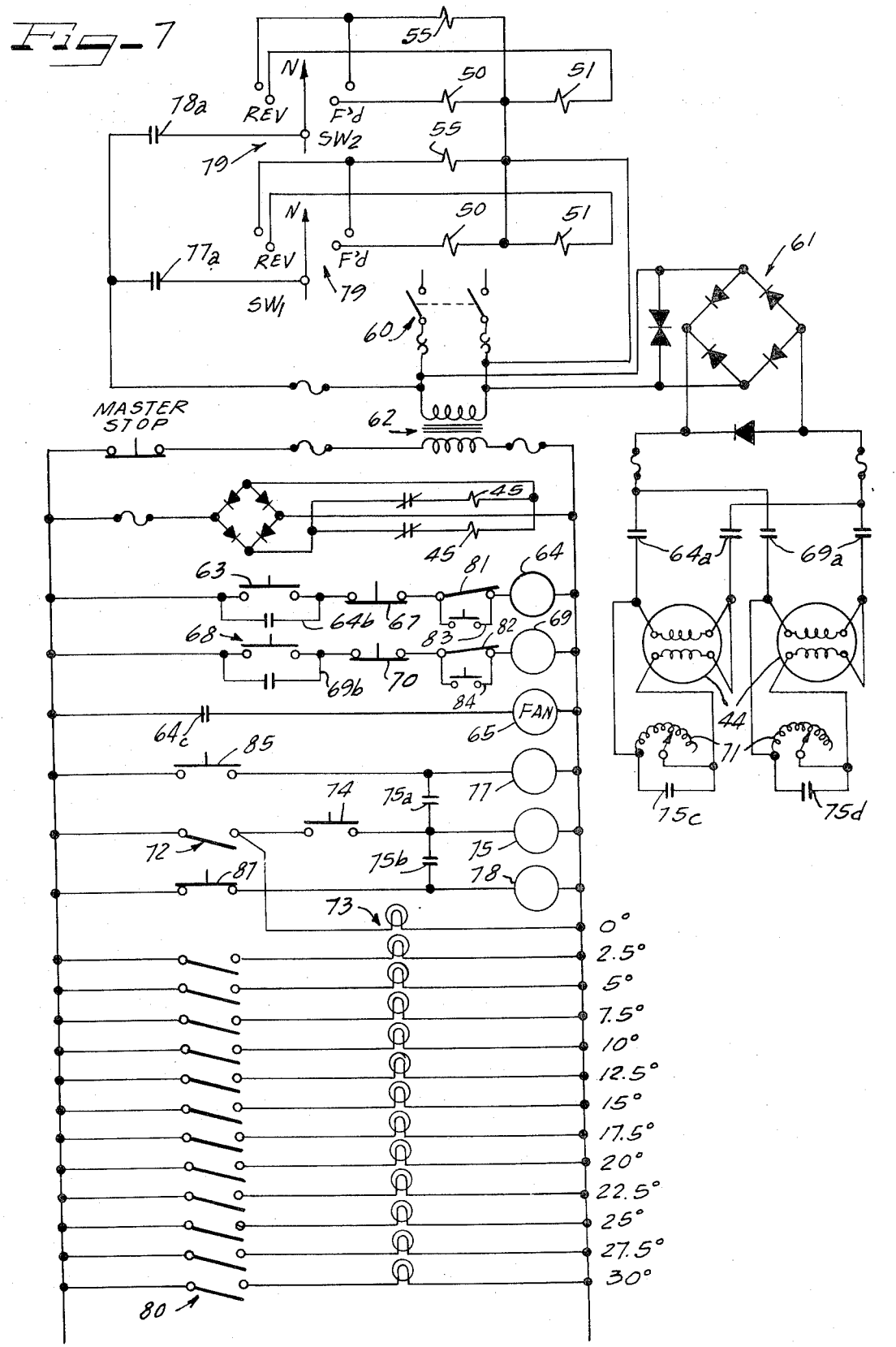

3,785,316

HEAVY DUTY SWIVEL PLATFORM CONVEYOR

This invention relates to heavy-duty conveyors, and is more particularly concerned with swivel platform conveyors adapted to be efficiently oriented with the direction of approach thereto of a mobile object to be received on the platform for transportation along a fixed path to a different position than that at which the object is received on the platform.

Although it will be apparent as the description proceeds that the present invention may have numerous and varied uses, an especially advantageous use, selected by way of example, involves the provision of a heavy-duty swivel platform conveyor especially adapted to serve as a landing pad for aircraft of the vertical take-off and landing type, such as helicopters, enabling transporting of the aircraft to and from a take-off and landing position and a storage position.

A special problem exists in respect to landing pads on shipboard where it is necessary to operate on limited deck space and often under adverse weather conditions. Due to wind and course conditions it is often necessary to take off and land the aircraft at angles that may vary within 30° from the ship axis. Take-off and landing operations are especially difficult in rough weather, high seas and strong wind situations. Handling of the aircraft on deck under adverse conditions can be quite hazardous due to tendency of the aircraft to slide or tip as caused by ship roll, heaving, pitching, wind effects, waves washing over the deck, and the like. Most of these hazards are experienced not only on the open dock, but also in the parking area or hangar.

An important object of the present invention is to overcome the foregoing and other disadvantages, deficiencies, inefficiencies, shortcomings and problems in prior methods and structures and to attain important advantages and improvements as will hereinafter become apparent.

Another object of the invention is to provide a new and improved apparatus and method especially suited to handling heavy mobile objects, and more particularly aircraft of the generally vertical take-off and landing type, such as helicopters.

A further object of the invention is to provide a new and improved heavy-duty swivel platform conveyor construction.

Still another object of the invention is to provide a new and improved conveyor construction utilizing long span screw assemblies.

Yet another object of the invention is to provide a new and improved heavy-duty swivel platform conveyor embodying a novel swiveling control mechanism.

A still further object of the invention is to provide a new method of handling aircraft between a landing and take-off position and a storage or parking position.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 3 is a schematic view of one form of long-span screw drive that may be employed in operating the platform;

FIG. 4 is a schematic illustration of another form of screw drive adapted for the present purpose;

FIG. 5 is an enlarged fragmentary sectional detail view taken substantially along the line V—V of FIG. 2;

FIG. 6 is a fragmentary sectional detail view taken substantially along the line VI—VI of FIG. 5; and FIG. 7 is a representative schematic illustration of electrical control circuitry for operating the conveyor system.

Figure 1:
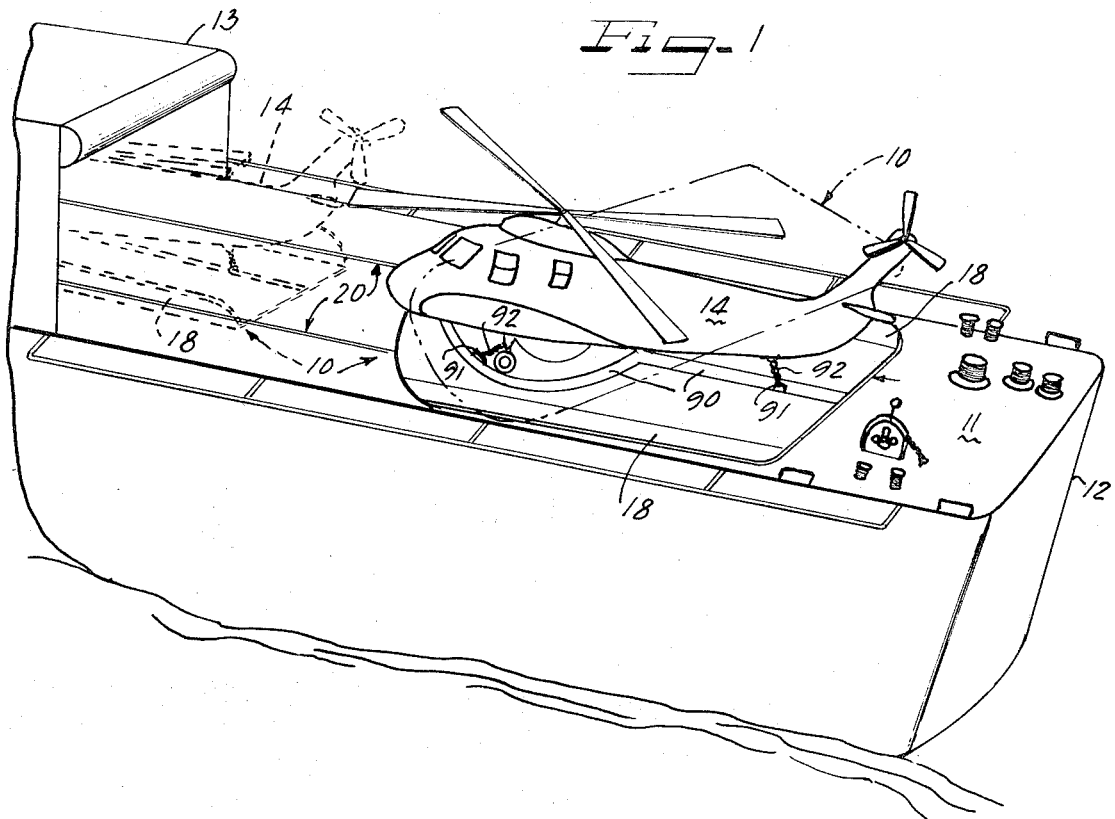
FIG. 1 is an illustrative view showing a heavy-duty swivel platform conveyor embodying features of the invention utilized as a shipboard landing and take-off pad for aircraft such as helicopters.
Figure 2:
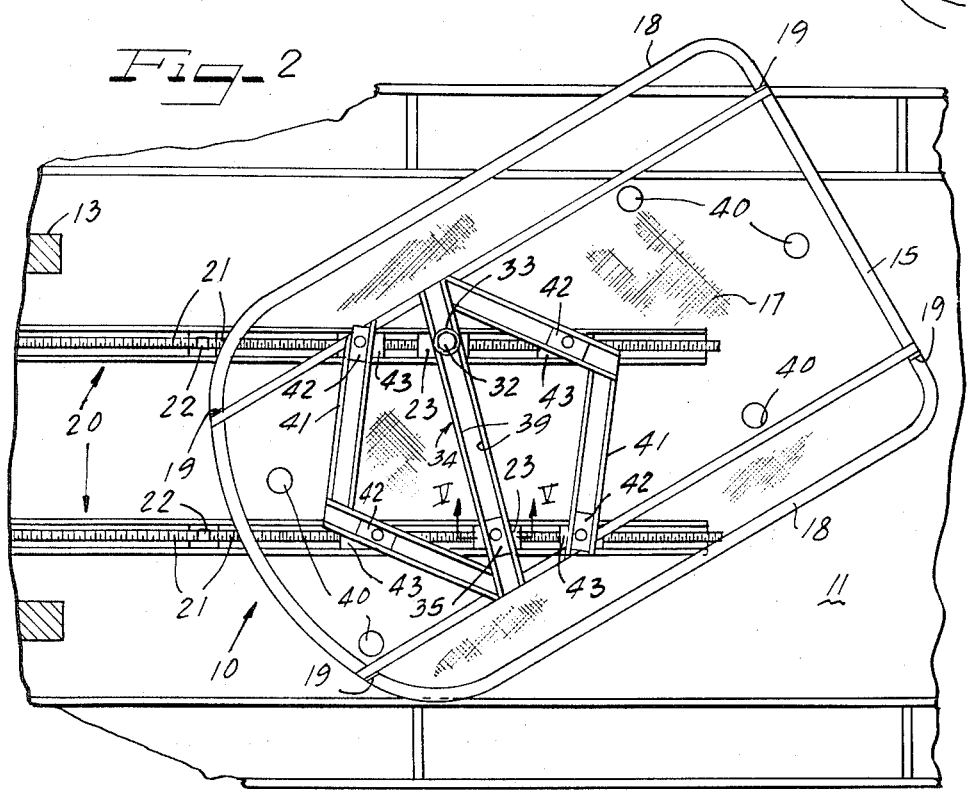
FIG. 2 is a top plan view of the platform.

On reference to FIGS. 1 and 2, an illustrative heavy duty swivel platform conveyor system 10 is depicted as especially adapted for use on a landing deck area 11 of a sea-going vessel 12 such as an aircraft mother ship, patrol ship, rescue ship, cruiser, destroyer, and the like. At one end of the area 11 may be provided an aircraft hanger 13 for servicing or storage parking of an aircraft such as a helicopter 14.

Construction of the platform 10 is suitable to meet the service and operating conditons for which intended. For example, as an aircraft handling device, and more particularly as a snare pad for helicopters, it must be capable of withstanding aircraft loads of on the order of six tons with surface dimensions of about 24 feet width and 35 feet length. It must also in a shipboard system be capable of withstanding wind, wave and water loads should ship roll and sea state combine to put green water over the deck. Ship roll and pitch will also impose forces and strains which must be successfully met. To this end, the platform 10 comprises a sturdy steel beam or bar frame 15 carrying fixedly thereon a suitable supporting surface 17 which may comprise steel plate but for shipboard use is desirably a heavy metal grid or grating structure. Where the space, such as the hanger 13 will not accommodate the total landing pad width of the platform 10, one or both opposite longitudinal sides thereof may be provided with respective extensions 18 therealong connected to the main body of the platform by means of hinge joints 19 so that they can be swung up from a flat planar relationship as depicted in full line in FIG. 1 to a generally upright relationship as shown in dash outline whereby to clear the inner sides of the hangar 13.

Means are provided for enabling traverse of the platform along the deck 11 between parking position within the hangar 13 and take-off and landing position out on the deck clear of the hangar, as well as to enable swiveling of the platform in a desirable range from its longitudinal traverse path axis. For this purpose, transporting screw means 20 are provided adapted to be mounted in a fixed path below the platform 10. In a preferred form, the screw means 20 are of the long span type disclosed in John C. Leming's U.S. Pat. No. 3,670,583 issued June 20, 1972. In this instance a pair of the screw assemblies 20 is provided in spaced parallel relation extending from as far within the hangar 13 as necessary to as far out on the deck 11 as necessary. Each of the screw assemblies 20 includes a series of corotatively connected screw sections 21 (FIGS. 2 and 5) rotatably supported by hangers or brackets 22. To maintain the deck 11 clear of obstruction, the screws 20 are mounted below the surface of the deck, desirably in channels 20a.

Means for operatively coupling the platform 10 with the screw means for driving the platform along the path by operation of the screw means comprise respective nuts 23 (FIGS. 2,5 and 6) which are non-rotatably coactive with and adapted to travel freely linearly along the respective screws. Each of the nuts 23 comprises a body 24 provided with a longitudinal clearance bore of a diameter to receive the transporting screw 20 therethrough in free spaced relation, with contact between the nut and the screw limited to useful work engagement between followers 27 carried by the body 24 and projecting operatively into the threads of the screw. For clearing the stationary supporting brackets 22, a narrow bracket-clearance slot 28 is provided radially in and throughout the length of the body 24 extending from the screw clearance bore 25 to the outer perimeter of the nut. Through this arrangement, rotation of the screw 20 in either rotary direction effects corresponding longitudinal travel of the nut 23 therealong. In such travel of the nut along the screw a stabilized substantially concentric spaced friction free relation therebetween is maintained by nut supporting and guiding means comprising a roller and track arrangement wherein the body 24 is provided with rollers 29 running along tracks provided by rail bars 30 rigid with the sides of the channels 23. For maximum stability and load supporting value, the nut bodies 24 are elongated with a plurality of rollers along each side, desirably comprising two pairs of rollers along each side with one pair adjacent one end and the second pair adjacent the opposite end and with each pair of rollers having its axis divergent to its companion so as to run along correspondingly divergently related longitudinal, oblique respective track surfaces 31 on the rails 30.

Both of the nuts 23 are connected to the platform 10 in a manner to enable driving of the platform longitudinally along the screws 20, and also to enable pivoting of the platform relative to the path of movement as desired. To this end, each of the nuts 23 carries an upstanding coupling and swivel stud 32 (FIG. 5). One of the nuts 23 has a connection 33 (FIG. 2) at a suitable fixed location along a transverse platfrom frame bar 34, while the other of the nuts 23 is pivotally connected by its swivel stud 32 with a runner carriage block 35 constructed on the order of the nut bodies 24, of generally elongated form and having a similar arrangement of pairs of anti-friction wheels 37 arranged to run along respective transversely oblique track surfaces 38 on rail bars 39 carried by the bar 34 which is in the form of an inverted channel for this purpose. By having the body of the platform frame 15 wider than the spacing between the screws 20, and the channel frame bar 34 even a slight bit longer than the width of the frame body, as by having the bar 34 disposed at an oblique angle relative to the axis of the frame, as shown in FIG. 2, with swiveling of the frame about the fixably located pivot 33, and movement of the runner 35 along the rails 39 as required, a full range of pivoting within the desired parameters, to the left or right of the screw-oriented traverse path is enabled. For example, the pivotal range may be on the order of 30° in either direction from the longitudinal centerline or axis of the traverse path provided by the screws 20.

Direct support of load from the platform 10 to the deck 11 is primarily through anti-friction means in the form of casters 40 (FIGS. 2 and 5) properly placed to afford stable loading without strain upon the couplings with the screws 20. Placement of the casters 40 is such that in every pivotal position and in the straight inline position of the platform 10 relative to the screws 20, the casters make contact with the deck, or at least a sufficient number of the casters will always be in contact with the deck to sustain the load. Inasmuch as the screw accommodating channels 23 are of relatively narrow width, there is little likelihood of the platform being swivelled to a position wherein more than one of the casters may be suspended in the space over one of the channels. At least at the rear end portion of the platform 10 the casters are disposed with full assurance of at least two of them, spaced traversely across the platform, being in full load sustaining engagement with the deck 11 in any swivelled position of the platform.

Additional means are provided to provide at least some load sustaining capability, and in any event stabilization of the platform 10 in any position thereof relative to the path of the longitudinal movement, as well as thorough anchorage to the deck resistive of any forces that might tend to lift the platform. Accordingly, at each side of the transverse channel member 34, a generally V-shaped inverted channel-shaped runner bar assembly 41 is provided having configuration the same as the bar 34. The bar assemblies 41 are in allochiral relative relattionship with each leg of the assembly accommodating a wheeled runner block 42 therein pivotally connected to an associated wheeled traveling block 43 to run along the underlying rails 30. Each of the stabilizing runner assemblies 42,43 may be of the same construction as the swivel and coupling nut 23 and the associated runner block 35, and the description for that assembly may be considered the same as the details for the stabilizers 42,43 with the exception that the traveling blocks 43 will not serve as nuts and thus be free from any followers coacting with the screws. Thereby, the traveling blocks 43 can move longitudinally relative to the screws 20 freely, without regard to the direction of rotation of the screws. Further, thereby the traveling block and runner assemblies can shift freely relative to one another, and to the screws 20 and to the frame of the platform, along the track provided by the stabilizer rail channel bar assemblies 41.

Traverse and pivotal movements of the platform 10 are effected by rotation of the screws 20, unison rotation of the screws in either direction causing corresponding traverse movement of the platform, and rotation of one of the screws while the other remains stationary or relative opposite hand rotation of the screws causing swiveling movement of the platform. For example, considered from the viewpoint of facing toward the hangar 13, movement of the platform 10 from the straight in line traverse position to the angular position shown in FIG. 2 can be effected by holding the right hand screw 20 stationary while the left hand screw is rotated to advance the left hand coupling nut 23 rearwardly, or for very rapid swiveling, the left hand screw can be operated to move the left hand coupling nut rearwardly while the right hand screw is operated simultaneously to advance the right hand coupling nut 23 forwardly. To effect swiveling in the opposite direction, just the reverse action of the screws is affected.

Driving of the screws 20 may be effected at their forward end, which, in this instance, will be inside the hangar 13. Desirable means for this purpose comprise, as shown in FIG. 3, for each screw, a variable speed motor 44 having a brake 45 adapted to be remotely controlled and positively locked by the brake 45 when not called upon to drive the associated screw. Driving power from the motor is transmitted through a shaft 47 and a gear box 48 having therein a reduction and reversing gear train and including a clutch arrangement including neutral position 49, a forward clutch element 50 and a reversing clutch element 51 and connected by a transmission shaft 52 and a coupling 53 with the associated screw 20. Normally "on" screw brake 54 and a control clutch 55 are provided on and in association with the transmission shaft 52 for manual override when necessary. A manually operated clutch 57 is provided in the shaft 47, and a manually operable gear train 58 in the portion of the shaft 47 which is disengageable through the clutch 57 from the motor attached portion of the shaft.

In a relatively more simple arrangement shown in FIG. 4, the motor 44' may be of the reversable type driving the screw 20 without a gear train transmission so that the shaft 47 is directly coupled by the coupling 53 to the screw and with the normally "on" brake 54, the control clutch 55, the manual clutch 57 and the manual drive 58 provided on and along the shaft.

Electrical control circuitry for the swivel platform conveyor operating system may be generally in accordance with that shown in FIG. 7. A master control switch 60 which may be in the form of a circuit breaker controls power to a full wave bridge silicon rectifier 61 which may be 240 volt single phase connected with the motors 44 adapted to power the respective long span drive screws. Power is also supplied to a 120 volt step down control transformer 62. Closing of a normally open start switch 63 energizes a control relay 64 which functions to close motor control contacts 64a for one of the motors 44 and also closes a holding circuit 64b, around the switch 63. A contact 64c is also closed to furnish power to a small fan 65 to cool this power supply. To stop the motor controlled by relay 64, a normally closed "stop" switch 67 is opened. The other motor 44 is adapted to be started by closing of a normally open start switch 68 which energizes a relay 69 whereby to close the relay contacts 69a for such other motor and also to close a holding circuit 69b around the switch 68. To stop this motor a normally closed stop switch 70 is opened. Respective rheostats 71 are provided to control the speed of the motors 44. When the platform 10 is in zero position, that is straight on with the path of traverse movement, a normally open limit switch 72 is closed and a corresponding identifying lamp in a battery of lamps 73 is illuminated. Closing of the switch 72 provides a current path enabling a normally open push button switch 74 to be closed whereby to energize a relay 75 and through relay contacts 75a and 75b energizing relays 77 and 78 whereby to close contacts 77a and 78a for selector switches 79 for selectively controlling the solenoids for the forward clutch 50 or the reverse clutch 51 as well as the brake clutch 55. At the same time, contacts 75c and 75d close bypass circuits around the rheostats 71 so that the motors 44 can operate at top speed. Further, energizing of relays 77 and 78 effects release of the motor brake 45.

When the platform 10 is in the rear landing and take-off position, swiveling to one side or the other may be effected by operating either selected one of the selector switches 79, respective limit switches 80 controlling respective ones of the lamps 73 to identify the degree of swiveling movement from the zero or straight-in-line position.

Should the degree of swiveling movement exceed desirable outside limits, such as 30°, then an override limit switch 81 or 82, as the case may be, will be opened and thereby shut off power to the motor 44 involved. Such motor may be restarted by reversing the associated selector switch 79 and depressing start button 63 and normally open pushbutton 83, or start button 68 and pushbutton 84. Either pushbutton 83 or 84, that is involved, must then be held down and a normally open pushbutton 85 or 87 depressed. This will clear the override. As soon as the proper position readout light 73 illuminates, switch 83 or 84 can be released, and normally closed limit switches 81 and 82 will again be in control.

In either the reverse or forward closing of the selector switch 79 in each instance, a respective clutch solenoid 55 is energized to release the normally "on" brake 54 of the screw 20 selected to be operated.

From the foregoing it will be apparent that all maneuvers of the platform 10 are adapted to be readily effected from a suitable control station by the several pushbutton controls in the system described in connection with FIG. 7.

For helicopter landing pad purposes, the platform 10 may be provided with a suitable landing target marking 90. In addition, the platform may be provided with suitable anchoring devices for tie-down chains or cables 92 connected to the aircraft and which may be of a type automatically releasable by the pilot for take-off.

There is thus provided a safe, efficient, simple method of handling heavy objects which must be transported along path between spaced positions and which may necessarily be oriented angularly relative to the path on approach to or departure from at least one of the positions, and comprising driving a swivel platform in a conveyor system along the path to and between the positions, and at said one position swiveling or turning the platform to accommodate the angular orienation of the object. This method is especially suited for handling aircraft of the general vertical take-off and landing type-such as helicopters, and more particularly on shipboard, where the platform provides a snare pad.

Although various minor modifications might be suggested by those versed in the art, it should be understood that we wish to embody within the scope of the patent warranted hereon all such embodiments as reasonably and properly come within the scope of our contribution to the art.

We claim as our invention:

1. A conveyor system for handling a heavy object which must be transported along a path between spaced positions and which may necessarily be oriented angularly relative to said path on approach to or departure from at least one of said positions, comprising:

a platform on which the object is supported bodily for transportation along said path;

a pair of spaced parallel tracks along said path between said positions under said platform;

a respective member to run along each of said tracks;

means for selectively driving said members along the respective tracks;

means swivelly connecting one of said members to the underside of said platform;

guide track means carried by the underside of said platform operatively aligned with said swivelly connecting means and extending transversely relative to said pair of tracks; and a runner block running along said track means and swively connected to the other of said members; whereby the platform can be moved along said parallel tracks by operating the driving means for both of said members in unison, and the platform can be swively moved by selectively operating the driving means for either of said members, the platform swiveling about said swively connecting means and said runner riding along said track means to compensate for changes in angularity of the track means relative to the tracks during the swivelling movements of the platform.

2. A conveyor system according to claim 1, including stabilizing track means carried by the platform, additional members running along said tracks, runner blocks running in said stabilizing track means, and swivel connections between said runner blocks and said additional members.

3. A conveyor system according to claim 1, having a pair of the additional members spaced from said respective members along said tracks, and said stabilizing track means extending angulalry relative to the direction of the guide track means.

4. A conveyor assembly according to claim 2, wherein said stabilizing track means comprise generally V-shaped inverted channel-shaped runner bar assemblies in allochiral relative relationship at each side of said guide track means and with each leg of each of the assemblies accommodating a separate one of the runner blocks swively connected to said additional members.

5. A conveyor system according to claim 1, wherein said driving means comprise respective rotary screws and means mounting the screws along said tracks, said respective members having follower means engaging the screws for actuation of the respective members by rotation of the screws, means for driving the screws respectively in either opposite rotary direction, and means for selectively controlling said driving means.

6. A conveyor system according to claim 5, wherein said means for driving the screws comprise reversible motors, and brake means for holding either respective screw non-rotatively when its motor is non-operating.

7. A conveyor system according to claim 6, wherein said controlling means comprise an electrical circuit for controlling the degree of swivelling motion of said platform through control of operation of said motors and brake means.

8. A conveyor system according to claim 1, including hinged side extensions on said platform projecting substantially laterally beyond the respective opposite sides of the platform and hingedly swingable into clearance relation over the sides of the platform from an extended position wherein the lateral dimensions of the platform are substantially increased.

9. A conveyor system according to claim 1, wherein said platform comprises a landing pad including a rugged frame and a deck structure on said frame, the landing pad being especially adapted for handling aircraft of the vertical take-off and landing type and including means for anchoring the aircraft to the platform for transportation on the platform between said positions.

10. A conveyor system according to claim 9, including a landing target indicia on the upper surface of said platform to facilitate landing of an aircraft accurately for support upon the platform.

11. In combination with a conveyor system according to claim 1, a flight deck having one of said spaced positons in a landing area on said flight deck, an aircraft hanger spaced from said one position and covering the other of said positions with an opening facing toward said one position, said platform comprising a vertical take-off and landing aircraft landing pad having means for anchoring an aircraft thereon in supported relation on said platform, and said driving means operating to effect transportation of the platform and an aircraft carried thereon to and between the interior of the hanger and said one position on the flight deck.

12. A conveyor system according to claim 1, wherein said platform comprises a rugged frame including longitudinal and transverse frame bars, said track means comprising bar structure secured to the transverse frame bars, and a deck structure carried on top of the frame bars.

13. A conveyor system according to claim 1, wherein said tracks comprise longitudinally extending upwardly opening channels having longitudinally extending vertical side walls, track bars extending longitudinally on said walls within said channels above the bottom of the channels, said members having wheels thereon engaging upper and lower track surfaces of said track bars.

14. A conveyor system according to claim 13, wherein said track means on the platform comprise a downwardly opening elongated channel having side walls, longitudinally extending track bars on said track means channel side walls, and said runner block having rollers engaging said track means channel track bars.

15. A method of handling a heavy object which must be transported along a path between spaced positions and which article may necessarily be oriented angularly relative to said path on approach to or departure from at least one of said positions, comprising:
placing said object on a platform which is operatively coupled with a pair of transporting long span screws extending along a pair of spaced parallel tracks extending along said path;
operating said screws in unison to effect traverse of the platform along said path and thereby transportation of the article along said path; and
relatively operating said screws to effect swivelling movement of the platform;

16. A method according to claim 15, including signalling the degrees of swivelling movement of the platform relative to said path.

17. A method according to claim 15, wherein said object is an aircraft and said platform comprises a landing pad, said spaced positions comprising a hanger and a landing and take-off area respectively, and including supporting the aircraft on the platform, connecting the aircraft releasably to the platform, and transporting the aircraft on said platform between said hanger and said area by operating said screws in unison to effect transporting of the platform.

18. A method according to claim 15, wherein said platform comprises an aircraft landing pad and said object comprises an aircraft, including supporting said aircraft on said platform, and securing said aircraft to the platform for transportation on the platform.

* * * * *